United States Patent
Yang et al.

(10) Patent No.: US 12,174,858 B1
(45) Date of Patent: Dec. 24, 2024

(54) DEVICE AND METHOD FOR DATA REUSE-BASED RESIZING

(71) Applicant: Mobilint, Inc., Seoul (KR)

(72) Inventors: Haechan Yang, Yongin-si (KR); Jongjun Park, Seoul (KR)

(73) Assignee: Mobilint, Inc., Seoul (KR)

( * ) Notice: Subject to any disclaimer, the term of this patent is extended or adjusted under 35 U.S.C. 154(b) by 0 days.

(21) Appl. No.: 18/789,248

(22) Filed: Jul. 30, 2024

Related U.S. Application Data

(63) Continuation of application No. PCT/KR2023/021752, filed on Dec. 27, 2023.

(30) Foreign Application Priority Data

Dec. 21, 2023 (KR) .......................... 10-2023-0187797

(51) Int. Cl.
*G06F 16/00* (2019.01)
*G06F 16/28* (2019.01)

(52) U.S. Cl.
CPC ................. *G06F 16/285* (2019.01)

(58) Field of Classification Search
CPC .................................................... G06F 16/285
USPC ....................................................... 707/738
See application file for complete search history.

(56) References Cited

U.S. PATENT DOCUMENTS

| | | | |
|---|---|---|---|
| 2014/0096038 A1* | 4/2014 | Schultz | H04L 67/51 715/753 |
| 2014/0195921 A1* | 7/2014 | Grosz | G06Q 30/0631 715/738 |
| 2016/0188136 A1* | 6/2016 | Lopez | G06F 8/61 715/731 |
| 2017/0364757 A1* | 12/2017 | Rajabizadeh | G06N 3/08 707/707 |

FOREIGN PATENT DOCUMENTS

| | | | | |
|---|---|---|---|---|
| KR | 10-2019-0023846 A | | 3/2019 | |
| KR | 1020190023846 | * | 3/2019 | ............... G06T 3/40 |
| KR | 10-2023-0060439 A | | 5/2023 | |

OTHER PUBLICATIONS

"Notice of Allowance" issued in KR 10-2023-0187797; mailed by the Korean Intellectual Property Office on Mar. 28, 2024.
"Written Decision on Registration" issued in KR 10-2023-0187797; mailed by the Korean Intellectual Property Office on Mar. 28, 2024.

* cited by examiner

*Primary Examiner* — Alexandria Y Bromell
(74) *Attorney, Agent, or Firm* — Studebaker & Brackett PC

(57) ABSTRACT

Provided are a device and a method for data reuse-based resizing. The device includes a memory that stores at least one process for performing data reuse-based resizing, and a processor that performs an operation according to the process. The processor resizes input data of (a×b) to output data of (a'×b') (a and b being a natural number) and selects input data from the input data of (a×b) as much as a preset number necessary to output each output data, based on a reuse mode preset to each output data.

4 Claims, 15 Drawing Sheets

FIG. 4
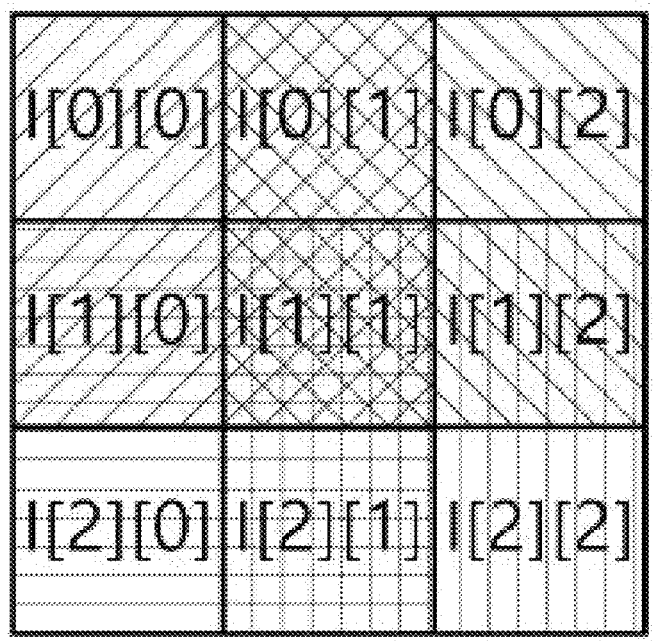
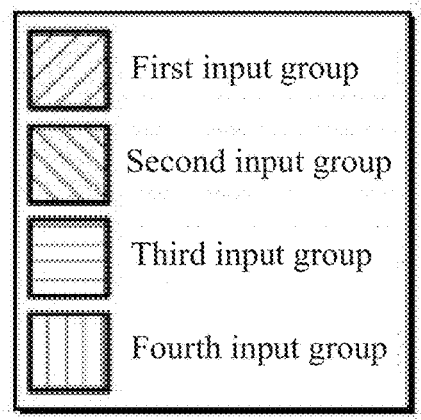

FIG. 7

| | valid-in w[0] | valid-in w[1] | valid-in h[0] | valid-in h[1] | in[0] [0] | in[0] [1] | in[1] [0] | in[1] [1] | constant |
|---|---|---|---|---|---|---|---|---|---|
| 1 | 0 | 0 | 0 | 0 | invalid | invalid | invalid | invalid | valid |
| 2 | 0 | 1 | 0 | 1 | invalid | invalid | invalid | valid | invalid |
| 3 | 1 | 0 | 1 | 1 | valid | invalid | invalid | invalid | invalid |
| 4 | 1 | 1 | 0 | 1 | invalid | invalid | valid | valid | invalid |
| 5 | 1 | 1 | 1 | 0 | valid | valid | invalid | invalid | invalid |
| 6 | 0 | 1 | 1 | 1 | invalid | valid | invalid | invalid | invalid |
| 7 | 1 | 0 | 1 | 1 | valid | invalid | valid | invalid | invalid |
| 8 | 1 | 1 | 1 | 1 | valid | valid | valid | valid | invalid |

| Area A, (L, M Skipped) | n = 4 | n = 8 | n = 16 | n = 32 |
|---|---|---|---|---|
| k = 8 | 1024 | 2048 | 4096 | 8192 |
| k = 10 | 1600 | 3200 | 6400 | 12800 |
| k = 12 | 2304 | 4608 | 9216 | 18432 |
| k = 14 | 3136 | 6272 | 12544 | 25088 |
| k = 16 | 4096 | 8192 | 16384 | 32768 |
| k = 18 | 5184 | 10368 | 20736 | 41472 |
| k = 20 | 6400 | 12800 | 25600 | 51200 |
| k = 22 | 7744 | 15488 | 30976 | 61952 |
| k = 24 | 9216 | 18432 | 36864 | 73728 |
| k = 26 | 10816 | 21632 | 43264 | 86528 |
| k = 28 | 12544 | 25088 | 50176 | 100352 |
| k = 30 | 14400 | 28800 | 57600 | 115200 |
| k = 32 | 16384 | 32768 | 65536 | 131072 |

| Area B, (L, M Skipped) | n = 4 | n = 8 | n = 16 | n = 32 |
|---|---|---|---|---|
| k = 8 | 464 | 784 | 1424 | 2704 |
| k = 10 | 700 | 1180 | 2140 | 4060 |
| k = 12 | 984 | 1656 | 3000 | 5688 |
| k = 14 | 1316 | 2212 | 4004 | 7588 |
| k = 16 | 1696 | 2848 | 5152 | 9760 |
| k = 18 | 2124 | 3564 | 6444 | 12204 |
| k = 20 | 2600 | 4360 | 7880 | 14920 |
| k = 22 | 3124 | 5236 | 9460 | 17908 |
| k = 24 | 3696 | 6192 | 11184 | 21168 |
| k = 26 | 4316 | 7228 | 13052 | 24700 |
| k = 28 | 4984 | 8344 | 15064 | 28504 |
| k = 30 | 5700 | 9540 | 17220 | 32580 |
| k = 32 | 6464 | 10816 | 19520 | 36928 |

DEVICE AND METHOD FOR DATA REUSE-BASED RESIZING

CROSS-REFERENCE TO RELATED APPLICATIONS

The present application is a continuation of International Patent Application No. PCT/KR2023/021752, filed on Dec. 27, 2023, which is based upon and claims the benefit of priority to Korean Patent Application No. 10-2023-0187797 filed on Dec. 21, 2023. The disclosures of the above-listed applications are hereby incorporated by reference herein in their entirety.

BACKGROUND

Embodiments of the present disclosure described herein relate to a device and a method for data reuse-based resizing.

A neural processing unit (NPU) is hardware designed for artificial intelligence tasks. Because the neural processing unit (NPU) which is implemented by imitating the human brain is capable of performing tasks faster and more efficiently than a central processing unit (CPU) and a graphics processing unit (GPU), the neural processing unit (NPU) is utilized for computation which is used in deep learning or AI algorithms.

Various resize operations are accompanied in the AI inference process, and a general-purpose device is required to support all the resize operations inside the NPU.

SUMMARY

Embodiments of the present disclosure provide a device and a method for data reuse-based resizing.

The problems to be solved by the present disclosure are not limited to the problems mentioned above, and any other problems not mentioned will be clearly understood by one skilled in the art from the following description.

According to an aspect of the present disclosure for achieving the above problem, a data reuse-based resizing device may include a memory that stores at least one process for performing data reuse-based resizing, and a processor that performs an operation according to the process. The processor may resize input data of (a×b) to output data of (a'×b') (a and b being a natural number) and may select input data from the input data of (a×b) as much as a preset number necessary to output each output data, based on a reuse mode preset to each output data.

Also, the reuse mode may include a first mode in which all of the preset number of input data are reused, a second mode in which only some of the preset number of input data are reused, and a third mode in which all of the preset number of input data are not reused.

In addition, the processor may classify the output data of (a'×b') into a plurality of output groups based on the input data of (a×b) and may classify the input data of (a×b) into a plurality of input groups based on the preset number.

Furthermore, the plurality of output groups may include a first output group, a second output group, a third output group, and a fourth output group, the plurality of input groups may include a first input group, a second input group, a third input group, and a fourth input group, and output data included in each of the first to fourth output groups may be calculated based on input data included in each of the first to fourth input groups.

Besides, in association with specific output data set to the second mode, the processor may reuse input data corresponding to a specific row or column from among an input group utilized to calculate neighboring output data of the specific output data, and the specific output data and the neighboring output data may be included in different output groups.

Also, in computation in which input data, the number of which is less than the preset number, are required to calculate the output data, the processor may determine data targeted for read-skip from among the preset number of input data based on a preset table for each output data.

In addition, the processor may calculate a value of the output data from a value corresponding to each of the input data by using three multipliers.

Furthermore, an area of the three multipliers may be calculated by Equation below, $$L \cdot (k^2 \cdot (n+2) + 2 \cdot k \cdot (n+1)) + M \quad \text{[Equation]}$$

(L and M being a constant, n being the number of bits of input data, and k being the number of bits of a weight).

According to another aspect of the present disclosure for achieving the above problem, a method which is performed by a device may include obtaining input data of (a×b) (a and b being a natural number), and resizing the input data of (a×b) to output data of (a'×b'). The resizing may include selecting input data from the input data of (a×b) as much as a preset number necessary to output each output data, based on a reuse mode preset to each output data.

Besides, a computer-readable recording medium storing a computer program for executing the method for implementing the present disclosure . . .

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 4 is a diagram for describing an input group according to an embodiment of the present disclosure;

FIGS. 7 and 8 are diagrams for describing a valid-in table according to an embodiment of the present disclosure;

FIG. 11 is a diagram for describing a difference in the area according to the number of multipliers, according to an embodiment of the present disclosure.

DETAILED DESCRIPTION

Figure 1:
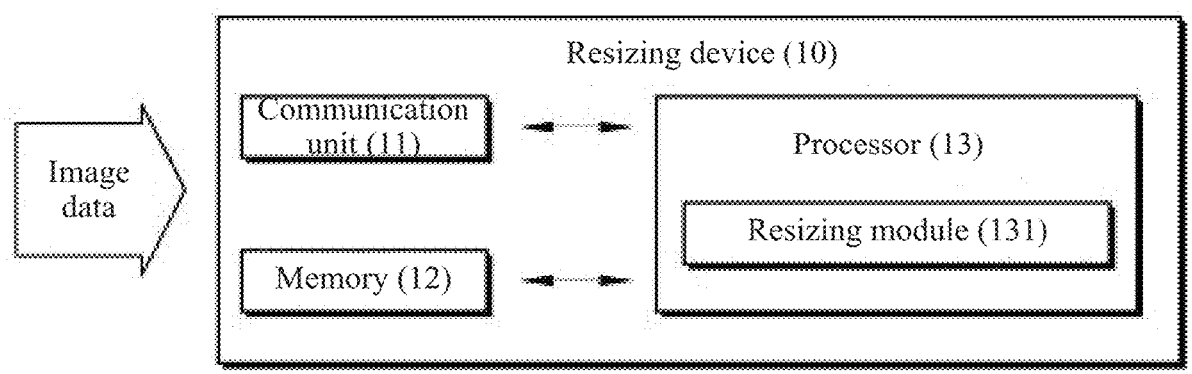
FIG. 1 is a diagram for describing a data reuse-based resizing device according to an embodiment of the present disclosure.

The same or similar reference numerals/signs refer to the same or similar components throughout the present disclosure. The present disclosure does not describe all components of embodiments, and the general content in the technical field to which the present invention pertains or the duplicated content between the embodiments is omitted. The terms "unit", "module", "member", and "block" used in the specification may be implemented by using software or hardware. Depending on embodiments, a plurality of "units", "modules", "members", and "blocks" may be implemented with a single component, or a single "unit", "module", "member", and "block" may include a plurality of components. Throughout the specification, when a part is described as being "connected to" another part, it includes the case where they are indirectly connected, as well as the case where they are directly connected, and the indirect connection includes the connection through a wireless communication network.

Also, when it is mentioned that a part "includes" a certain component, this means that any other component(s) may be further included, rather than excluding any other component(s), unless otherwise stated.

Throughout the specification, when a first member is described as being "on" a second member, it includes the case where a third member is present between the first and second members, as well as the case where the first member is in contact with the second member.

The terms such as first, second, etc. are used to distinguish one component from another component, and the components are not limited by the above terms.

A singular expression includes a plural expression, unless there are obvious exceptions in the context.

In each step, a reference sign is used for convenience of description, and the reference sign does not describe the order of respective steps. Each step may be carried out to be different from the specified order unless the specific order is clearly stated in the context.

Below, the operation principle and embodiments of the present disclosure will be described with reference to the accompanying drawings.

In the specification, a "device" includes all of various devices capable of providing results to a user by performing arithmetic processing. For example, the device according to the present disclosure may include a computer, a server device, and a portable terminal or may be implemented in the form of any one thereof.

Herein, the computer may include, for example, a laptop, a desktop, a tablet PC, a slate PC, etc., which is equipped with a web browser.

The server device which is a server processing information through the communication with an external device may include an application server, a computing server, a database server, a file server, a game server, a mail server, a proxy server, a web server, etc.

The portable terminal which is a wireless communication device ensuring portability and mobility may include all types of handheld-based wireless communication devices such as a personal communication system (PCS), global system for mobile communications (GSM), a personal digital cellular (PDC), a personal handyphone system (PHS), personal digital assistant (PDA), international mobile telecommunication (IMT)-2000, code division multiple access (CDMA)-2000, wideband code division multiple access (W-CDMA), a wireless broadband Internet (WiBro) terminal, and a smartphone, and a wearable device such as a watch, a ring, a bracelet, an anklet, a necklace, glasses, a contact lens, or a head-mounted device (HMD).

An artificial intelligence-related function according to the present disclosure is executed through a processor and a memory. The processor may include one processor or a plurality of processors. In this case, one processor or a plurality of processors may be a general-purpose processor, such as a CPU, an AP, or a digital signal processor (DSP), a graphic dedicated processor, such as a GPU or a vision processing unit (VPU), or a processor for artificial intelligence such as an NPU. One processor or a plurality of processor control the processing of input data depending on a predefined operation rule or an artificial intelligence model stored in a memory. Alternatively, when one processor or a plurality of processors are processors for artificial intelligence, the processor(s) for artificial intelligence may be designed in a hardware structure specialized for processing a specific artificial intelligence model.

The predefined operation rule or artificial intelligence model is characterized in that it is implemented through learning. Herein, that the predefined operation rule or artificial intelligence model is implemented means that, as a basic artificial intelligence model is trained by a learning algorithm by using a plurality of training data, there is implemented the predefined operation rule or artificial intelligence model set to perform a desired characteristic (or objective). The learning may be performed on the device in which the artificial intelligence is internally executed or may be performed through a separate server and/or a separate system. As an example of the learning algorithm, there is supervised learning, unsupervised learning, semi-supervised learning, or reinforcement learning, but the present disclosure is not limited to the above example.

The artificial intelligence model may include a plurality of neural network layers. Each of the plurality of layers has a plurality of weight values and performs a neural network operation through computation between computational results of previous layers and the plurality of weight values. The plurality of weights which the plurality of neural network layers have may be optimized by a learning result of the artificial intelligence model. For example, the plurality of weights may be updated to decrease or minimize a loss or cost value obtained by the artificial intelligence model in the learning process. The artificial neural network may include a deep neural network (DNN). For example, the artificial intelligence network includes a convolutional neural network (CNN), a deep neural network (DNN), a recurrent neural network (RNN), a restricted boltzmann machine (RBM), a deep belief network (DBN), a bidirectional recurrent deep neural network (BRDNN), or deep Q-Networks but is not limited to the above examples.

The processor may generate a neural network, may train or learn the neural network, may perform computation based on received input data, may generate an information signal based on a computation result, or may retrain the neural network.

Below, embodiments of the present disclosure will be described in detail with reference to accompanying drawings.

FIG. 1 is a diagram for describing a data reuse-based resizing device (hereinafter referred to as "resizing device") 10 according to an embodiment of the present disclosure.

Prior to the description, under the condition that various resize operations are accompanied in the AI inference process, the case that a plurality of modules suitable for respective operations are used is advantageous in that the difficulty in implementation is low and is disadvantageous in that the efficiency of area decreases. In the present disclosure, a single general-purpose module capable of supporting all of various operations is utilized for the efficiency of area of a device.

The resizing device 10 of the present disclosure may introduce the normalization and modification of a resize-specialized data reuse technique, a read-skip technique utilizing a valid-in table, and a fixed-point system NPU-specialized resize algorithm for implementation of the small area and may perform various resize operations which are used in an AL inference algorithm.

Herein, the resize operation may include various custom resizing algorithms in addition to bilinear interpolation, nearest-neighbor interpolation, constant padding, zero padding, crop, flip, and rotation.

Referring to FIG. 1, the resizing device 10 may include a communication unit 11, a memory 12, and a processor 13. In some embodiments, the resizing device 10 and the processor 13 may include components, the number of which is less than or more than the number of components illustrated in FIG. 1.

The communication unit 11 may include one or more components enabling the communication with various devices each including a communication module; for example, the communication unit 11 may include at least one of a broadcast receiving module, a wired communication module, a wireless communication module, a short-range communication module, and a location information module. The short-range communication module may include a module (e.g., an ultra-wideband (UWB) communication module) for recognizing the approach of an external device.

Various types of communication networks may be used as a communication network; for example, there may be used a wireless communication method, such as wireless LAN (WLAN), Wi-Fi, Wibro, WiMAX, or high speed downlink packet access (HSDPA), or a wired communication method such as Ethernet, xDSL (ADSL or VDSL), hybrid fiber coax (HFC), fiber to the curb (FTTC), or fiber to the home (FTTH).

Meanwhile, the communication network is not limited to the communication methods disclosed above, and in addition to the above communication methods, the communication network may include any other communication methods which are widely known or are to be developed in future.

The wired communication module may include various wired communication modules, such as a local area network (LAN) module, a wide area network (WAN) module, or a value added network (VAN) module, as well as various wired communication modules such as a universal serial bus (USB), a high definition multimedia interface (HDMI), a digital visual interface (DVI), recommended standard232 (RS-232), power line communication, or a plain old telephone service (POTS).

In addition to a Wi-Fi module and a wireless broadband module, the wireless communication module may include a wireless communication module, which supports various wireless communication methods such as global system for mobile communication (GSM), code division multiple access (CDMA), wideband code division multiple access (WCDMA), universal mobile telecommunications system (UMTS), time division multiple access (TDMA), long term evolution (LTE), 4G, 5G, and 6G.

The short-range communication module which is for short-range communication may support short-range communication by using at least one of Bluetooth™, radio frequency identification (RFID), infrared data association (IrDA), ultra wideband (UWB), ZigBee, near field communication (NFC), wireless-fidelity (Wi-Fi), Wi-Fi Direct, and wireless universal serial bus (USB) technologies.

The memory 12 may store at least one process for performing data reuse-based resizing.

The memory 12 may store data supporting various functions of the resizing device 10 of the present disclosure and a program for operations of the processor 13, may store pieces of data (e.g., a music file, a still image, and a video) targeted for input/output, and may store a plurality of application programs (or applications) to be driven in the resizing device 10 of the present disclosure, pieces of data for operations of the resizing device 10 of the present disclosure, and instructions. At least some of the application programs may be downloaded from an external server through the wireless communication.

The memory 12 described above may include a storage medium whose type corresponds to a type of at least one of a memory (e.g., an SD or XD memory) of a flash memory type, a hard disk type, a solid state drive (SSD) type, a silicon disk drive (SDD) type, or a multimedia card micro type, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc, etc. Also, the memory 12 may be separated from the resizing device 10 of the present disclosure but may be used as a database connected in a wired or wireless manner.

The processor 13 may perform an operation depending on the process stored in the memory 12. The processor 13 may perform the above operations by using a memory, which stores an algorithm for controlling operations of the components in the resizing device 10 of the present disclosure or data for a program implementing the algorithm, and data stored in the memory. In this case, each of the memory 12 and the processor 13 may be implemented with an individual chip. Alternatively, the memory 12 and the processor 13 may be implemented with a single chip.

The processor 13 which is a neural processing unit may include a resizing module 131 being a single general-purpose module. In some embodiments, the processor 13 may include components, the number of which is less than or more than the number of components illustrated in FIG. 1.

Also, to implement various embodiments according to the present disclosure to be described with reference to FIGS. 2 to 12 on the resizing device 10 of the present disclosure, the processor 13 may control any one of the components described above or a combination thereof.

Below, a method in which the resizing device 10 resizes data based on the data reuse will be described in detail with reference to FIGS. 2 to 12.

Figure 2:
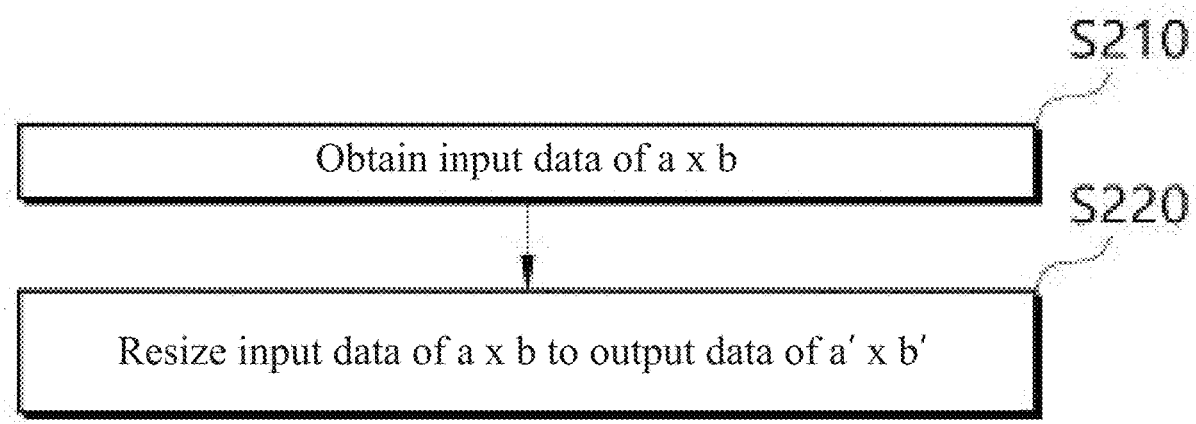
FIG. 2 is a flowchart of a data reuse-based resizing method according to an embodiment of the present disclosure.

FIG. 2 is a flowchart of a data reuse-based resizing method according to an embodiment of the present disclosure.

Figure 3:
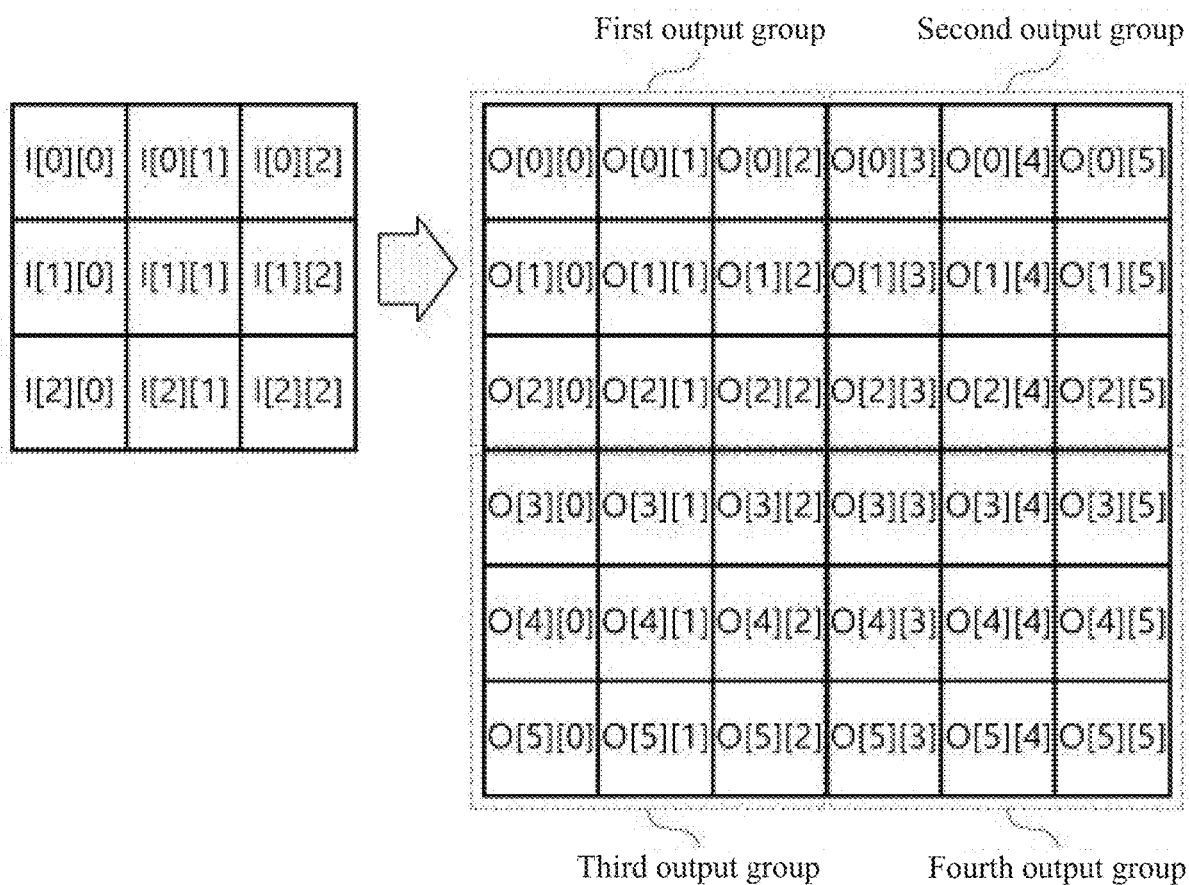
FIG. 3 is a diagram for describing an output group according to an embodiment of the present disclosure.

FIG. 3 is a diagram for describing an output group according to an embodiment of the present disclosure.

FIG. 4 is a diagram for describing an input group according to an embodiment of the present disclosure.

FIGS. 5A to 5D are diagrams for describing how input data are used for each output data, according to an embodiment of the present disclosure.

Figure 6:
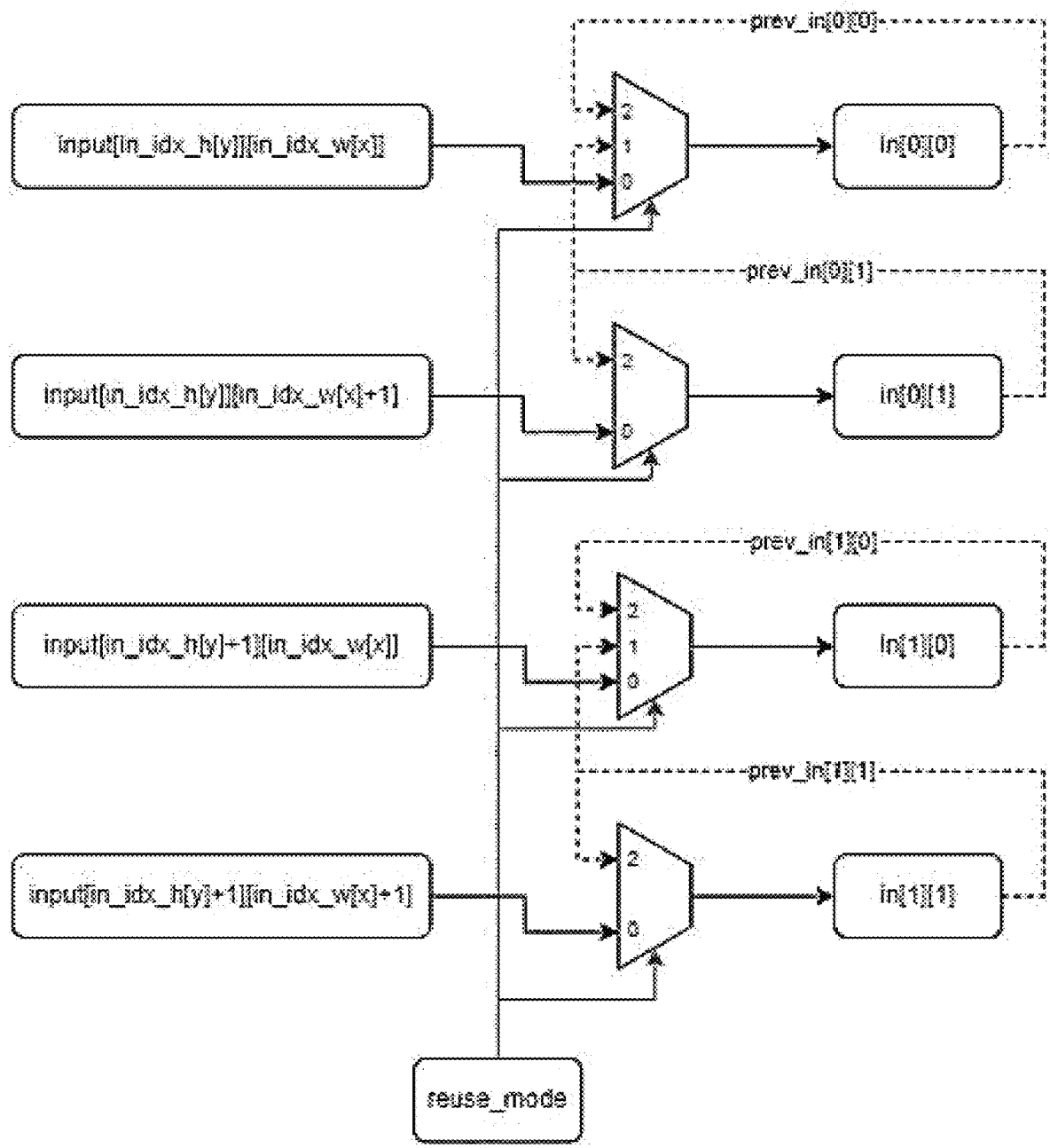
FIG. 6 is a hardware diagram of an input data reusing process according to an embodiment of the present disclosure.

FIG. 6 is a hardware diagram of an input data reusing process according to an embodiment of the present disclosure.

Figure 8:
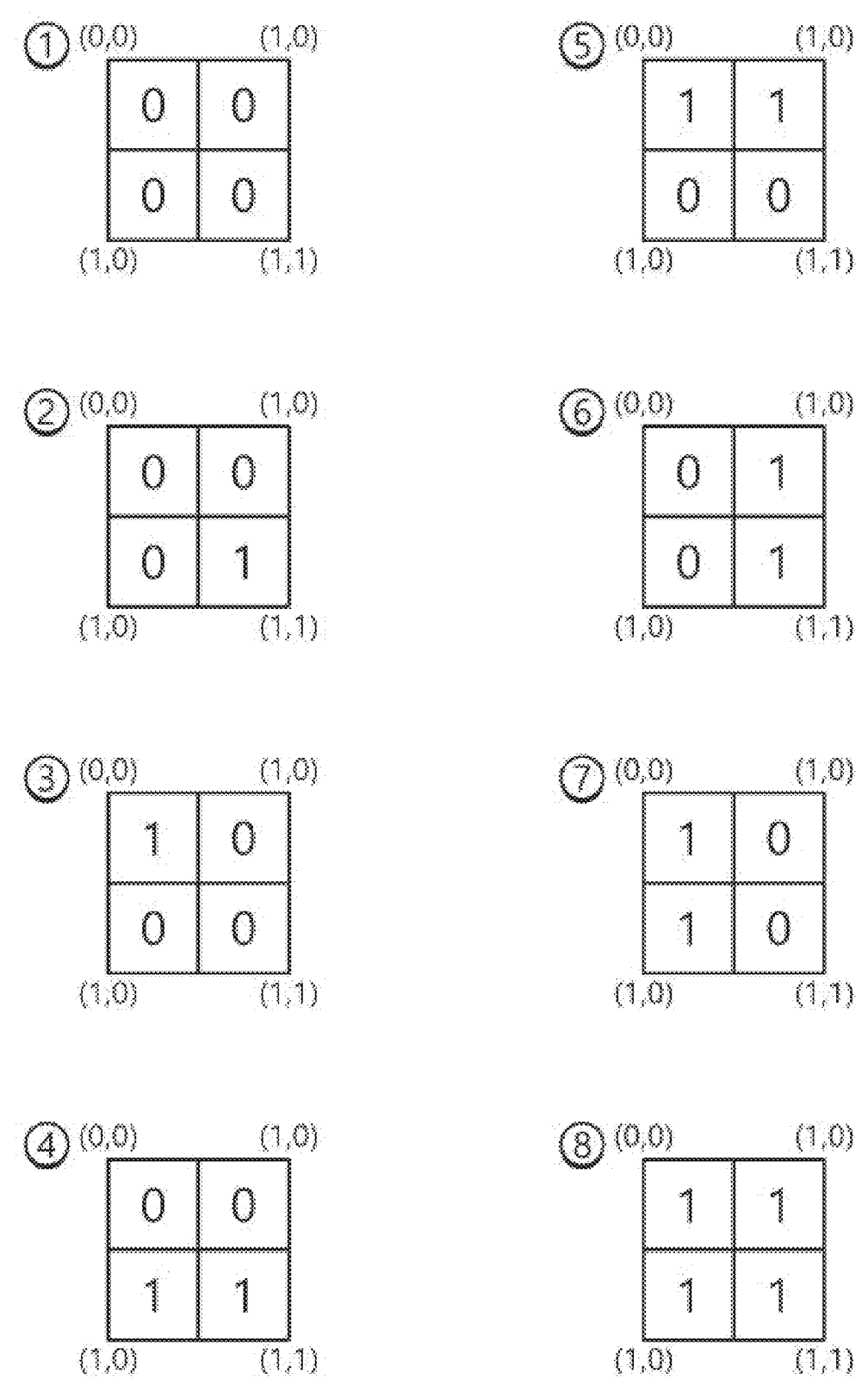

FIGS. 7 and 8 are diagrams for describing a valid-in table according to an embodiment of the present disclosure.

Figure 9:
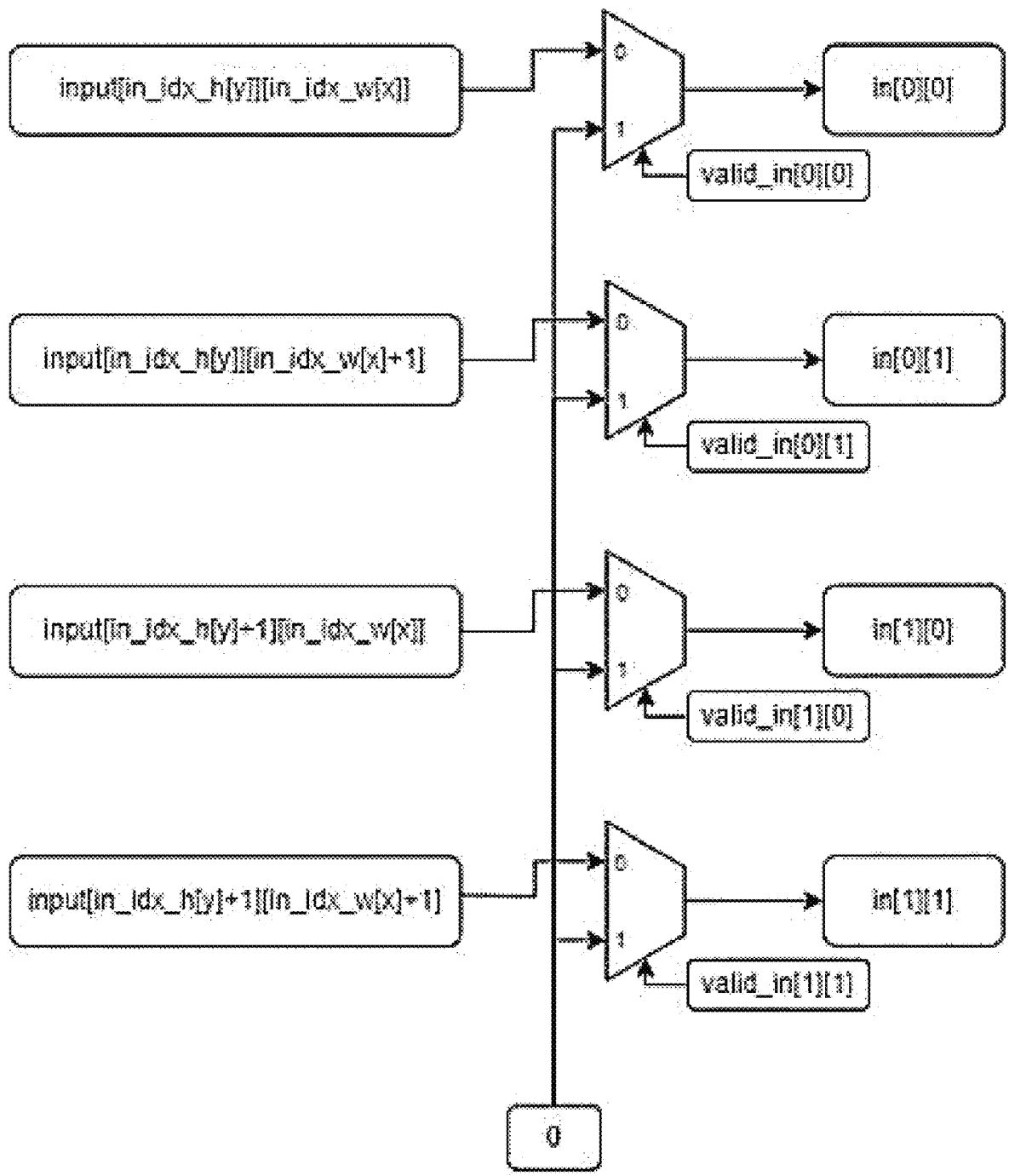
FIG. 9 is a hardware diagram of a structure in which a valid-in table is applied, according to an embodiment of the present disclosure.

FIG. 9 is a hardware diagram of a structure in which a valid-in table is applied, according to an embodiment of the present disclosure.

Figure 10:
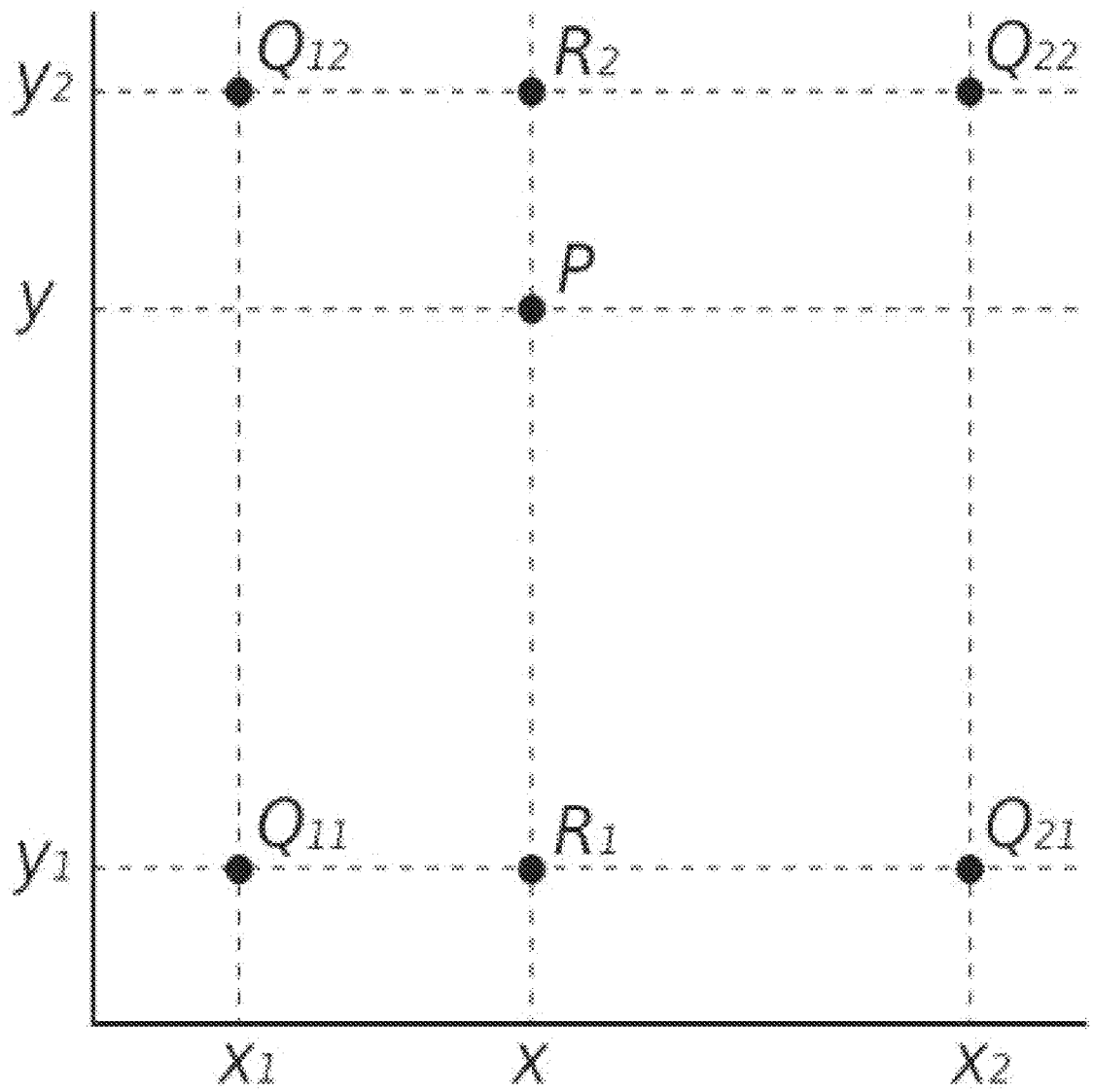
FIG. 10 is a diagram for describing bilinear interpolation according to an embodiment of the present disclosure.

FIG. 10 is a diagram for describing bilinear interpolation according to an embodiment of the present disclosure.

FIG. 11 is a diagram for describing a difference in the area according to the number of multipliers, according to an embodiment of the present disclosure.

Figure 12:
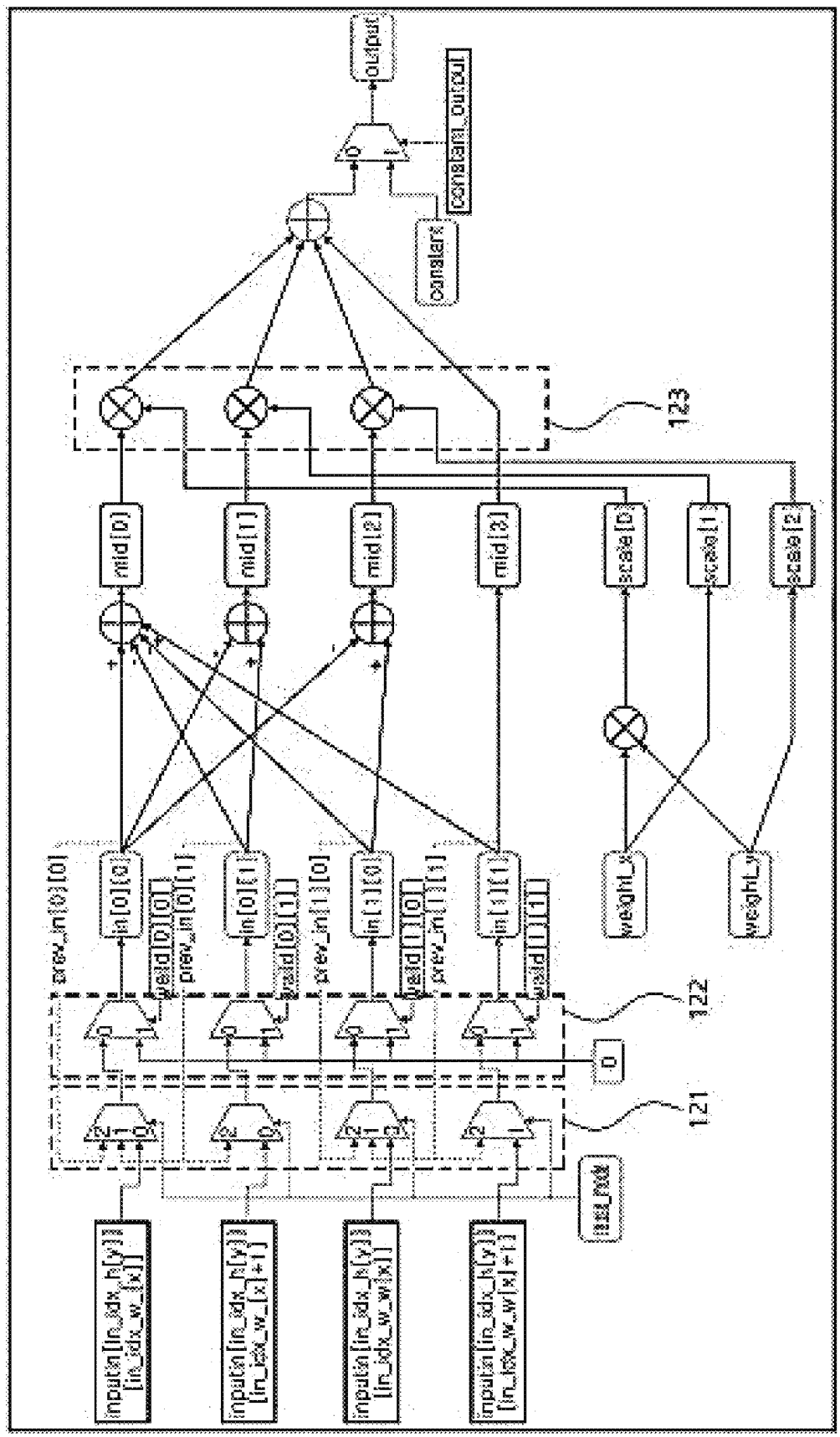
FIG. 12 is a diagram for describing an overall structure of a resizing device according to an embodiment of the present disclosure.

FIG. 12 is a diagram for describing an overall structure of a resizing device according to an embodiment of the present disclosure.

Referring to FIG. 2, the processor 13 may obtain input data of (a×b) from an external server or an external device (S210) through the communication unit 11. Herein, "a" and "b" are identical or different natural numbers.

The input data may be in the form of an image but are not limited thereto.

The reason for resizing the input data is to improve the accuracy of an analysis result without data loss.

The resizing module 131 of the processor 13 may resize the input data of (a×b) to output data of (a'×b') (S220). Herein, the number of output data may be a multiple of the number of input data.

To resize the input data of (a×b) to the output data of (a'×b'), the resizing module 131 of the processor 13 may select input data from the input data of (a×b) as much as the preset number necessary to output each output data, based on a reuse mode set for each output data.

Herein, the reuse mode may include a first mode in which all of the preset number of input data are reused, a second mode in which only some of the preset number of input data are reused, and a third mode in which all of the preset number of input data are not reused.

That is, when all input data used to obtain one output data duplicate with input data of previous output data, when all input data used to obtain one output data duplicate with some of input data of previous output data, and when all input data used to obtain one output data do not duplicate with input data of previous output data, the resizing module 131 of the processor 13 may read input data necessary for each output data depending on a total of three modes; when reused, the resizing module 131 of the processor 13 may reuse previous input data.

Below, a method of reading input data for each single output data (a resize-specialized data reuse method) will be described in detail with reference to FIGS. 3 to 5D. Below, the case where the size of input data is (3×3) and the size of output data is (6×6) (i.e., the case in which the size of input data is resized two times) will be described as an example. However, the size of input data and the size of output data are not limited to (3×3) and (6×6), respectively, and various sizes may be applied thereto. The present disclosure may also be applied to the case where the size of input data and the size of output data are not the size of a square.

The resizing module 131 of the processor 13 may classify output data of (6×6) into a plurality of output groups based on the input data of (3×3).

In detail, output data may be classified into a plurality of output groups to be suitable for the number of input data.

Referring to FIG. 3, because the number of input data is 9, 36 output data may be classified into 4 output groups each including 9 output data.

The resizing module 131 of the processor 13 may classify the input data of (3×3) into a plurality of input groups based on the preset number.

In detail, input data may be classified into a plurality of input groups to be suitable for the preset number; in this case, some of input data included in each of the plurality of input groups may duplicate with some of input data included in any other input group.

Referring to FIG. 4, 9 input data may be classified into 4 input groups each including 4 input data. In this case, "I[0] [1]" may be included in the first input group and the second input group in duplicate; "I[1] [0]" may be included in the first input group and the third input group in duplicate; "I[1] [2]" may be included in the second input group and the fourth input group in duplicate; and, "I[2] [1]" may be included in the third input group and the fourth input group in duplicate. Also, "I[1] [1]" may be included in the first input group, the second input group, the third input group, and the fourth input group in duplicate.

When the above grouping of the input data and the output data is completed, 4 input data included in the same input group are read in association with 9 output data included in each output group. That is, in association with the 9 output data included in the first output group, the 4 input data included in the first input group may be used for computation. Pieces of input data included in the plurality of input groups in duplicate may be reused for computation.

A computation order for 36 output data may progress left to right for each row. Accordingly, for each row, O[0] [0], O[1] [0], O[2] [0], O[3] [0], O[4] [0], and O[5] [0] may belong to the first order, and O[0] [5], O[1] [5], O[2] [5], O[3] [5], O[4] [5], and O[5] [5] may belong to the last order.

Figure 5A:
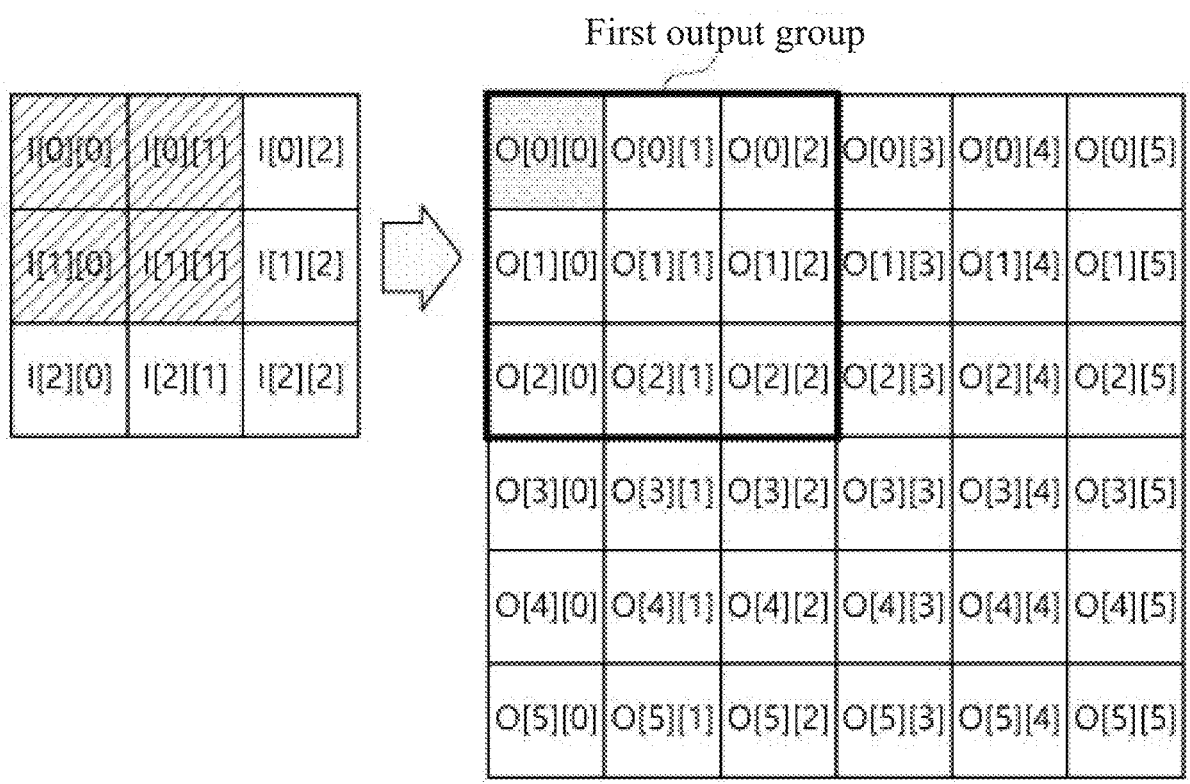
FIGS. 5A to 5D are diagrams for describing how input data are used for each output data, according to an embodiment of the present disclosure.

Referring to FIG. 5A, because the output data O[0] [0] included in the first output group belong to the first order of the corresponding row, in the case of O[0] [0], the third mode in which input data to be reused do not exist may be set. Accordingly, in the computation of O[0] [0], I[0][0], I[0] [1], I[1] [0], and I[1] [1] included in the first input group may be read.

Figure 5B:
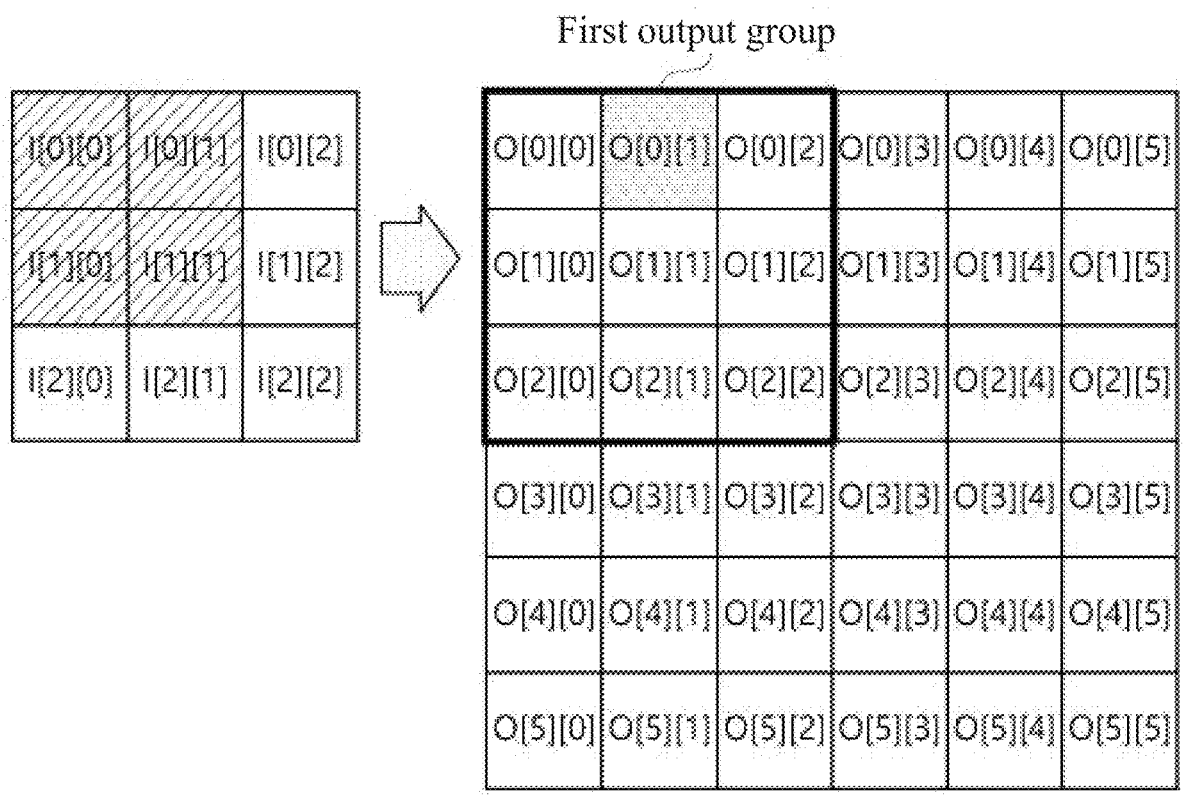

Referring to FIG. 5B, because the output data O[0] [1] included in the first output group belong to the second order of the corresponding row and are included in the same group as O[0] [0] being previous output data, the first mode in which all input data are reused. Accordingly, in the computation of O[0] [1], I[0] [0], [0] [1], I[1] [0], and I[1] [1] included in the first input group may be read.

Figure 5C:
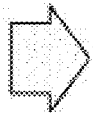

Referring to FIG. 5C, because the output data O[0] [2] included in the first output group belong to the third order of the corresponding row and are included in the same group as O[0] [1] being previous output data, the first mode in which all input data are reused may be set. Accordingly, in the computation of O[0] [2], I[0] [0], I[0] [1], I[1] [0], and I[1] [1] included in the first input group may be read.

Figure 5D:
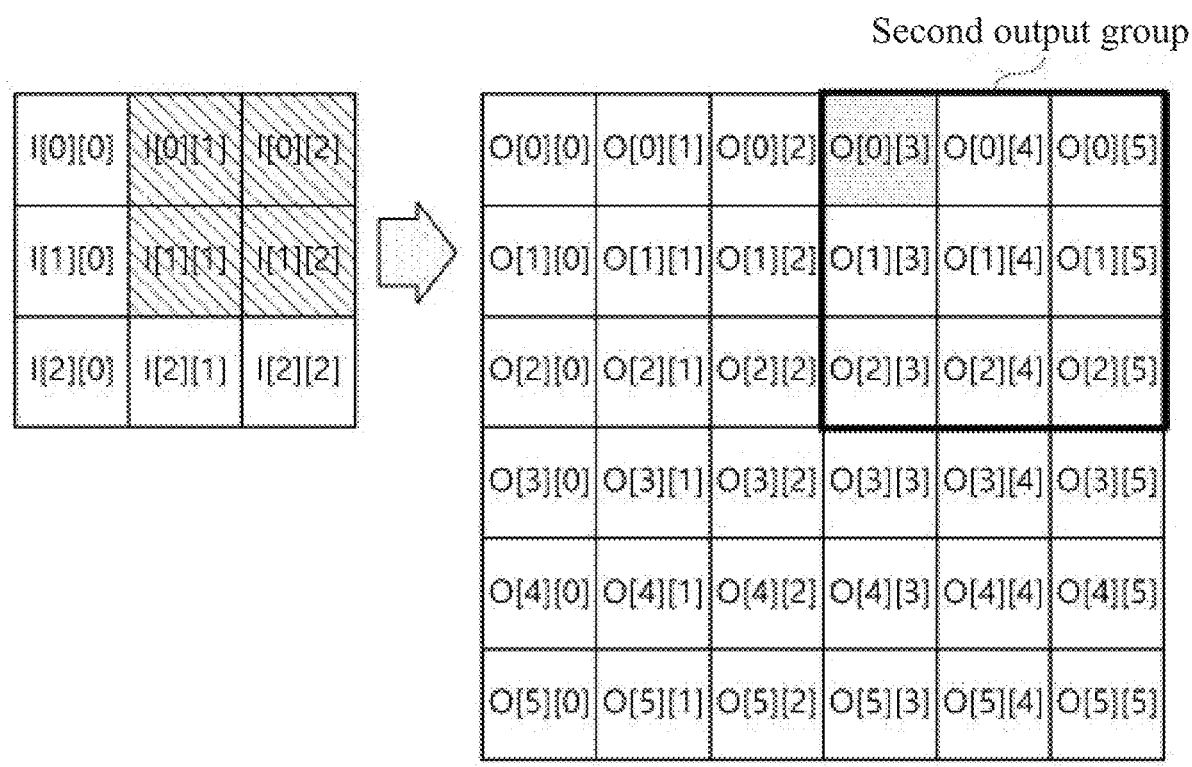

Referring to FIG. 5D, because the output data O[0] [3] included in the second output group belong to the fourth order of the corresponding row and an output group is changed (i.e., the change from the first output group to the second output group is made), the second mode in which some of input data are reused may be set. Accordingly, in the computation of O[0] [3], I[0] [1], I[0] [2], I[1] [1], and I[1] [2] included in the second input group may be read. Herein, I[0] [1] and I[1] [1] are reused.

As described above, when the change of an output group is made, in association with the first output data O[0] [3], O[3] [0], or O[3] [3] of each output group, the second mode in which some of input data are reused may be set. In association with specific output data O[0] [3], O[3] [0], or O[03] [3] set to the second mode, the resizing module 131 of the processor 13 may reuse input data corresponding to a specific row or column from among an input group utilized to calculate neighboring output data of the specific output data. In this case, the specific output data and the neighboring output data may be included in different output groups.

For example, O[0] [3] may use the input data I[0] [1] and I[1] [1] corresponding to a specific column from among the first input group utilized for the neighboring output data O[0] [2]. Also, O[3] [0] may use the input data I[1] [0] and I[1] [1] corresponding to a specific row from among the first input group utilized for the neighboring output data O[2] [0]. Also, O[3] [3] may use the input data I[1] [1] and I[2] [1] corresponding to a specific column from among the third input group utilized for the neighboring output data O[3] [2]. In addition, O[3] [3] may use the input data I[1] [1] and I[1] [2] corresponding to a specific row from among the second input group utilized for the neighboring output data O[2] [3].

Referring to FIG. 6, it is understood that values of 4 input data are output depending on a set reuse mode.

As described above, in the present disclosure, to perform various resize operations in a single module, the single module is implemented to include a circuit which performs a weighted-sum operation on 4 input data, based on an operation (e.g., bilinear interpolation) with the highest complexity. However, in this case, the bilinear interpolation requires 4 neighboring input data for one output data; in contrast, because the remaining operations (e.g., nearest-neighbor interpolation, zero, and constant padding) require input data, the number of which is less than 4, even though 4 input data are read, a weight to be multiplied to unnecessary input data is "0". This means that there is no influence on actual output data. Accordingly, in the present disclosure, the resizing module 131 is implemented based on the bilinear interpolation; in particular, it is possible to remove an unnecessary delay in various resize operations by selecting any data, which are to be read-skipped, from among four neighboring input data by introducing the valid-in table as illustrated in FIG. 7.

That is, in computation in which input data, the number of which is less than the preset number, are required to calculate output data, the resizing module 131 of the processor 13 may determine data targeted for read-skip from among the preset number of input data, based on the preset valid-in table for each output data.

Referring to FIG. 7, input data being invalid are read-skipped, and input data being valid may be read.

Referring to ③ of FIG. 8, (0,0) is 1 (=1*1), (0,1) is 0 (=1*0), (1,0) is 0 (=0*1), and (1,1) is 0 (=0*0). Accordingly, only I[0] [0] is valid, and the remaining I[0] [1], I[1] [0], and I[1] [1] are invalid.

Also, like ①, when all of 4 input data are invalid, a constant may be determined as being valid.

As described above, the resizing module 131 of the processor 13 may reduce an unnecessary delay in the resize operation by determining whether to skip the read operation on 4 input data for each of the output data of (6×6) (a total of 36 output data).

Referring to FIG. 9, it may be determined whether to output a value of each input data or 0, depending on a valid_in value.

Meanwhile, the present disclosure provides the modification of a generalized algorithm for generalization of an algorithm and low-area implementation to implement hardware capable of universally supporting various resizing algorithms to be used in the AI inference operation. Below, the bilinear interpolation which is a standard resize operation will be described as an example.

In the graph illustrated in FIG. 10, "P" may be obtained by using Equation 1 to Equation 3 below.

$$R1(x,y)=Q11 \cdot (x2-x)/(x2-x1)+Q21 \cdot (x-x1)/(x2-x1) \qquad \text{[Equation 1]}$$

$$R2(x,y)=Q12 \cdot (x2-x)/(x2-x1)+Q22 \cdot (x-x1)/(x2-x1) \qquad \text{[Equation 2]}$$

$$P(x,y)=R1 \cdot (y2-y)/(y2-y1)+R2 \cdot (y-y1)/(y2-y1) \qquad \text{[Equation 3]}$$

In this case, assuming that $(x=x))/(x2-x1)$ is wx1, $(x2-x)/(x2-x1)$ is wx2, $(y-y1)/(y2-y1)$ is wy1, $(y2-y)/(y2-1)$ is wy2, Equation 1 to Equation 3 above may be expressed like Equation 4 to Equation 6 below.

$$R1(x,y)=Q11 \cdot wx2+Q21 \cdot wx1 \qquad \text{[Equation 4]}$$

$$R2(x,y)=Q12 \cdot wx2+Q22 \cdot wx1 \qquad \text{[Equation 5]}$$

$$P(x,y)=R1 \cdot wy2+R2 \cdot wy1 \qquad \text{[Equation 6]}$$

Finally, P(x, y) may be obtained by Equation 7 below.

$$P(x)=Q11 \cdot wx2 \cdot wy2+Q21 \cdot wx1 \cdot wy2+Q12 \cdot wx2 \cdot wy1+ Q22 \cdot wx1 \cdot wy1 \qquad \text{[Equation 7]}$$

Assuming that input data are n-bit data and a weight is a k-bit weight, when a circuit is implemented like Equation 7, the circuit may include four k-bit×k-bit×n-bit multipliers, and the area A of the four multipliers may be calculated by Equation 8 below.

$$4 \cdot L \cdot n \cdot k^2 + M \qquad \text{[Equation 8]}$$

(L and M being a constant, n being the number of bits of input data, and k being the number of bits of a weight).

In this case, wx2 is equal to (1−wx1), and wy2 is equal to (1−wy1).

Accordingly, Equation 7 may be expressed by Equation 9 and Equation 10 below.

$$P(y)=Q11 \cdot (1-wx1) \cdot (1-wy1)+Q21 \cdot wx1 \cdot (1-wy1)+Q12 \cdot (1-wx1) \cdot wy1+Q22 \cdot wx1 \cdot wy1 \qquad \text{[Equation 9]}$$

$$P(x,y)=wx1 \cdot wy1 \cdot (Q11-Q21 \cdot Q12+Q22)+wx1 \cdot (-Q11+ Q21)+wy1 \cdot (-Q11+Q12)+Q11 \qquad \text{[Equation 10]}$$

As Equation 7 is transformed into Equation 10, the number of multipliers may decrease to 3, and the area B of the three multipliers may be calculated by Equation 11 below.

$$L \cdot (k^2 \cdot (n+2)+2 \cdot k \cdot (n+1))+M \qquad \text{[Equation 11]}$$

(L and M being a constant, n being the number of bits of input data, and k being the number of bits of a weight).

Referring to FIG. 11, the area A of 4 multipliers and the area B of 3 multipliers may be confirmed for respective bit sizes of input data and weights. It may be understood from a comparative table of FIG. 11 that the size of the area B is smaller than the size of the area A in all cases. That is, the implementation of the small area is possible by transforming Equation 7 into Equation 10.

In addition, by masking unnecessary data with "0" through the value of the valid-in table in Equation 7 or Equation 10 above or by adjusting a weight to "0" or an appropriate value, the application to the remaining resizing algorithms in addition to the bilinear interpolation is possible.

As illustrated in FIG. 12, the resizing module 131 of the processor 13 may read input data depending on the reuse mode (121); in this case, a value of the output data may be calculated from a value corresponding to each input data by skipping the read operation on unnecessary data (122) by using the valid-in table to reduce unnecessary operations and processing the read values by using three multipliers (123).

FIG. 2 describes steps or operations as being executed sequentially. However, this is provided only as an example to describe the technical idea of the present embodiment.

One skilled in the art to which the present embodiment pertains may apply various revision and modification such that the order described in FIG. 2 is changed and executed or the steps or operations are executed in parallel, without departing from the essential characteristics of the present embodiment. Accordingly, FIG. 2 is not limited to a time-series order.

Meanwhile, in the above description, the steps or operations described in FIG. 2 may be further divided into additional steps or operations or may be combined into fewer steps or operations, depending on an example to implement the present disclosure. In addition, some steps or operations may be omitted as needed, and the order between steps or operations may be changed.

Meanwhile, the disclosed embodiments may be implemented in the form of a recording medium storing instructions executable by a computer. The instructions may be stored in the form of a program code, and the instructions, when executed by a processor, may generate a program module to perform the operations of the disclosed embodiments. The recording medium may be implemented with a computer-readable recording medium.

The computer-readable recording medium includes all types of recording media storing instructions capable of being interpreted by the computer. For example, there may be a read only memory (ROM), a random access memory (RAM), a magnetic tape, a magnetic disk, a flash memory, an optical data storage device, etc.

According to the above solutions of the present disclosure, it may be possible to increase the efficiency of the area and performance of a device by supporting various resize operations necessary for an AI inference process through one single module in an NPU.

The effects of the present disclosure are not limited to the effects mentioned above, and any other effects not mentioned will be clearly understood by one skilled in the art from the following description.

The embodiments are described above with reference to the accompanying drawings. One skilled in the art to which the present disclosure pertains will understand that the present disclosure may be implemented in forms different from those of the disclosed embodiments without changing the technical idea or essential features of the present disclosure. The disclosed embodiments are provided as an example and should not be construed as limiting.

What is claimed is:

1. A data reuse-based resizing device comprising:
a memory configured to store at least one process for performing data reuse-based resizing; and
a processor configured to perform an operation according to the process,
wherein the processor is configured to:
resize a first number of input data corresponding to a first size (a*b) to a second number of output data corresponding to a second size (c*d) (a, b, c, and d being a natural number); and
read input data necessary to output each of the second number of output data from among the first number of input data based on a reuse mode set for each of the second number of output data,
wherein the processor is configured to:
classify the first number of input data into a plurality of input groups based on a preset number; and
classify the second number of output data into a plurality of output groups based on the first number of input data,
wherein some of input data included in any one group of the plurality of input groups duplicate with some of input data included in another group among the plurality of input groups,
wherein the reuse mode includes a first mode in which all of the preset number of input data are reused, a second mode in which only some of the preset number of input data are reused, and a third mode in which all of the preset number of input data are not reused,
wherein, in computation where input data, the number of which is less than the preset number, are required to output each of the second number of output data, the processor read-skips at least one of the preset number of input data included in each of the plurality of input groups by applying a preset valid-in table to each of the plurality of input groups,
wherein, in an operation of resizing the first number of input data to the second number of output data, the processor calculates a value of each of the second number of output data based on a value corresponding to the read input data by using three multipliers, and
wherein an area of the three multipliers is calculated based on bilinear interpolation in consideration of a square value of a weight and a value of the weight.

2. The data reuse-based resizing device of claim 1, wherein, in association with specific output data set to the second mode, the processor reuses input data corresponding to a specific row or column from among an input group utilized to calculate neighboring output data of the specific output data, and
wherein the specific output data and the neighboring output data are included in different output groups.

3. A method which is performed by a device, the method comprising:
obtaining a first number of input data corresponding to a first size (a*b) (a and b being a natural number); and
resizing the first number of input data to a second number of output data corresponding to a second size (c*d) (c and d being a natural number),
wherein the resizing includes:
reading input data, which are necessary to output each of the second number of output data, from among the first number of input data based on a reuse mode set for each of the second number of output data,
wherein the resizing includes:
classifying the first number of input data into a plurality of input groups based on a preset number; and
classifying the second number of output data into a plurality of output groups based on the first number of input data,
wherein some of input data included in any one group of the plurality of input groups duplicate with some of input data included in another group among the plurality of input groups,
wherein the reuse mode includes a first mode in which all of the preset number of input data are reused, a second mode in which only some of the preset number of input data are reused, and a third mode in which all of the preset number of input data are not reused,
wherein the resizing includes:
read-skipping at least one of the preset number of input data included in each of the plurality of input groups by applying a preset valid-in table to each of the plurality of input groups, in computation where input data, the number of which is less than the preset number, are required to output each of the second number of output data, wherein the resizing includes:

calculating a value of each of the second number of output data based on a value corresponding to the read input data, by using three multipliers, and wherein an area of the three multipliers is calculated based on bilinear interpolation in consideration of a square value of a weight and a value of the weight.

4. A computer-readable recording medium coupled to a hardware computer and storing a computer program executing the method of claim 3.

* * * * *